Jan. 2, 1951          J. H. MUNCY          2,536,074

ONE-WAY CLUTCH AND CONTROL THEREFOR

Filed Dec. 9, 1946

INVENTOR
JAMES HENRY MUNCY

BY

ATTORNEY

Patented Jan. 2, 1951

2,536,074

UNITED STATES PATENT OFFICE 2,536,074

ONE-WAY CLUTCH AND CONTROL THEREFOR

James Henry Muncy, Cambridge, Mass.

Application December 9, 1946, Serial No. 715,128

3 Claims. (Cl. 192—47)

(Granted under the act of March 3, 1883, as amended April 30, 1928; 370 O. G. 757)

The present invention relates in general to mechanical clutches and more particularly to an accurate positioning single or partial revolution clutch.

In certain control applications, it is desirable to have intermittent rotary motion of a driven shaft, with a source of continuous power being applied to the driving shaft. Particular applications requiring this condition are film winding mechanisms for cameras, or in apparatus for introducing time delays in the operation of switches. It is also desirable that when the driven shaft is rotated a specified amount, for example, a quarter revolution, some means be provided for positioning the driven shaft at precisely one-quarter or other fractional part of a revolution.

Intermittent rotary motion has previously been achieved by intermittent gearing, ratchet gearing, and Geneva movements. These systems are, in general, rather bulky and complex in nature, and do not provide accurate positioning of the driven shaft.

Accordingly, the primary object of the present invention is to provide a clutch which will permit intermittent rotary motion of a driven shaft.

A further object of the present invention is to provide a clutch which will accurately position a driven shaft after intermittent rotation thereof.

Still another object of the present invention is to provide a clutch of simple construction which will permit intermittent rotary motion of a driven shaft.

With the foregoing objects in view, the invention resides in certain novel features of construction and combination herein described and claimed and shown in the accompanying drawings wherein:

Figure 1:
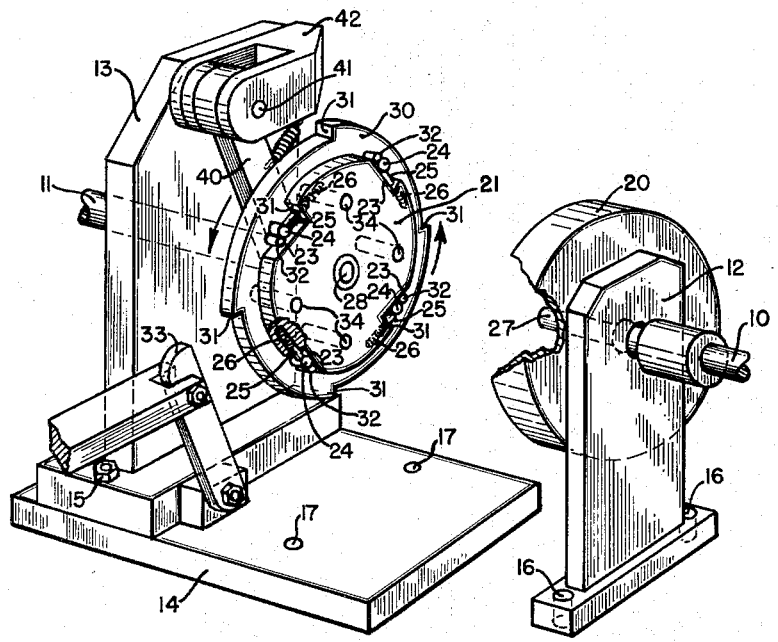
Fig. 1 is an exploded perspective view of a quarter-revolution clutch.

Referring to the drawings, and more particularly to Fig. 1, the clutch mechanism is used as a coupling means between driving shaft 10, and driven shaft 11. Shaft 10 is driven continuously by a suitable driving motor (not shown) and shaft 11 is connected to some rotary mechanism (not shown) to which an intermittent rotary motion is to be imparted. Shaft 10 is journalled in a suitable bearing positioned in supporting bracket 12, and shaft 11 is correspondingly journalled in supporting bracket 13. Supporting bracket 13 is securely attached to base 14 by lug bolts 15. When the clutch is in assembled form, base 12 is also attached to base 14 with lug bolts (not shown) inserted through holes 16 in bracket 12 and into holes 17 in base 14.

The clutch mechanism itself comprises essentially a driving race 20, a roller cam 21, and a release plate 30. Roller cam 21 is constructed from a circular metal plate of slightly smaller diameter than the internal dimension of driving race 20, thereby allowing the roller cam to fit inside the driving race when the clutch is assembled. In the embodiment illustrated four cut-outs 23 are milled in the periphery of cam 21 to serve as bearing surfaces for rollers 24. These cutouts are produced by milling four substantially half-segment slots, equally spaced about the periphery of the disc. It will be apparent from an analysis of a circle, that such segments cut in the periphery produce surfaces inclined toward the circumference when moving outwardly thereon. The rollers 24 are of a length equal to the thickness of the roller cam, and of a diameter slightly less than the maximum radial dimension of the cut-outs. A plunger 25 is inserted in a hole drilled in the radial face of each cut-out, and is spring loaded by compression springs 26 positioned within the holes as shown. These spring loaded plungers 25 force the rollers 24 along the inclined surface of the cut-outs 23. The springs 26 are of sufficient strength and the rollers 24 are of such diameter that the latter are held against the inner cylindrical surface of the driving race 20 when the clutch is assembled. The frictional contact between the driving race 20 and the rollers 24 thus transmits torque from the driving shaft 10 to the roller cam 21, which is in turn rigidly attached to the driven shaft 11. To facilitate assembly of the clutch, pilot shaft 27 extending from the center of the driving race 20, is adapted to engage the hollow end 28 of the driven shaft 11.

Four cut-outs and associated rollers and plungers are illustrated in the preferred embodiment of Fig. 1, but it will be apparent to those skilled in the art that any number of rollers providing the necessary frictional engagement may be used. This will, of course, depend upon consideration of load torque requirements and clutch diameter.

The control of engagement and disengagement of the clutch is afforded by release plate 30 rotatably mounted on shaft 11 within predetermined limits adjacent roller cam 21. Release plate 30 is maintained in the proper axial position on the shaft by a retaining collar (not shown) positioned on shaft 11 between plate 30 and supporting bracket 13. Rotary motion is imparted to the release plate 30 by four wedging pins 34 which are rigidly attached to roller cam 21, and extend through elongated openings 35 in the release plate. To determine the amount of revolution of the driven shaft, notches 31 are cut in the periphery of the release plate. For a quarter-revolution clutch as shown in Fig. 1, the notches are spaced at 90 degree intervals. For single revolution operation but one notch is required, and of course for half-revolution two notches spaced 180 degrees apart are necessary. Extending outwardly from the face of the release plate 30 adjacent roller cam 21 are four fixed release pins 32. These pins are of a length substantially equal to the thickness of roller cams 21, and are so disposed on release plate 30 as to engage rollers 24. Release lever 33 which may be manually or electrically operated is pivotally attached to base 14 and adapted to positively stop release plate 30 by engagement with any one of notches 31 when rotation is in the direction indicated.

The operation of the clutch is as follows: With release lever 33 disengaged from notch 31, spring-loaded plungers 25 hold rollers 24 against the inner periphery of driving race 20, thereby permitting rotation of roller cam 21 and release plate 30 upon rotation of driving shaft 10 and its associated driving race 20. The clutch remains engaged so long as release lever 33 is displaced from release plate 30, as shown in Fig. 1. When release lever 33 is moved to engage one of the notches 31 of release plate 30, release pins 32 force rollers 24 down the incline of cut-outs 23 against the pressure of springs 26, the plunger 25 being pushed completely into the holes which hold the springs. Since rollers 24 are of a diameter less than the radial depth of cut-outs 23, the rollers are pushed away from contact with driving race 20. Driving shaft 10 continues to rotate but driven shaft 11 is stopped. When release lever 33 is tripped, the clutch is again engaged. For exactly one-quarter revolution motion, the release lever is tripped and immediately dropped back to engage the next notch, which will arrive after 90 degrees of clutch rotation.

Figure 2:
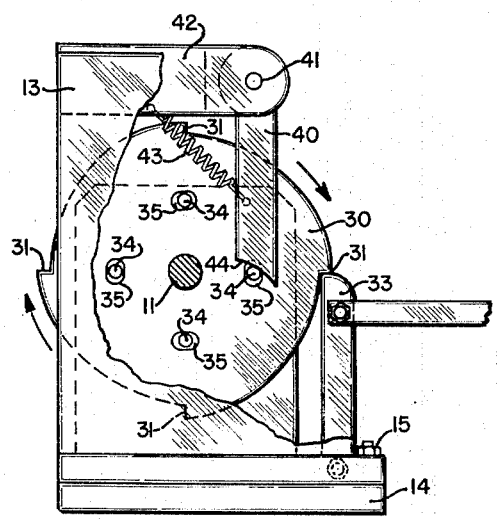
Fig. 2 is a left end elevation of the clutch which illustrates the accurate positioning feature of the embodiment of Fig. 1.

To maintain the driven shaft at exactly the quarter revolution position, apparatus is provided to prevent the compressed springs 26 from causing reverse rotation of the roller cam 21, which would drive the rollers 24 back into contact with driving race 20, thus re-engaging the clutch even when release lever 33 is engaged with one of the notches 31. This "hunting" of the driven shaft is precluded by the accurate positioning feature of the clutch, most clearly illustrated in Fig. 2. Wedging lever 40 is pivotally mounted at 41 to bifurcated pivot arm 42, which is in turn removably attached to supporting bracket 13. The wedging lever 40 is held by the tension of spring 43, such that it rides over wedging pins 34 as the roller cam 21 and release plate 30 rotate in the direction indicated. As previously mentioned wedging pins 34 are rigidly attached to roller cam 21, and extend through and beyond release plate 30. Wedging pins 34 and notches 31 are diametrically arranged in release plate 30, such that, the engagement of release lever 33 with one of the notches 31, occurs simultaneously with the engagement of wedging lever 40 and the respective wedging pin 34. The concave curvature of lever 40 at its lower end 44, coupled with the tension of spring 43, forces wedging pin 34 and with it roller cam 21, to a point where rollers 24 are pressed against the radial faces of cut-outs 23, thereby forcing plungers 25 completely into their respective positioning openings. In this condition, rotation of release plate 30 is prevented by engagement of release lever 33, and reverse motion of roller cam 21 is prevented by wedging lever 40 being in engagement with a wedging pin attached to the roller cam. Consequently, driven shaft 11 is accurately positioned and the clutch is disengaged. It will be noted that it is not necessary to release wedging lever 40 when re-engagement of the clutch is desired, since tripping of release lever 33 into the position shown in Fig. 1 will automatically release wedging lever 40 as well as cause engagement of the clutch.

From the foregoing description it is seen that the clutch of this invention is compact and relatively simple in construction. It may be designed for operation under varying driving torque conditions, and accurately positions the driven shaft when disengaged.

The invention described herein may be manufactured and used by or for the Government of the United States of America for government purposes without the payment of any royalty thereon or therefor.

What is claimed is:

1. A clutch for coupling a driving and a driven shaft comprising a roller cam secured to said driven shaft, a driving race secured to said driving shaft, said driven and said driving shafts being rotatably journalled in a supporting base, a plurality of half-segment slots equally spaced around the periphery of said roller cam, each of said slots being formed with a single radial face and an inclined surface extending from said radial face and intersecting the periphery of said roller cam, a corresponding plurality of rollers mounted to move in a direction having a radial component along said inclined surfaces, the diameter of said rollers being less than the radial dimension of said half-segment slots, a corresponding plurality of spring-loaded plungers positioned normal to the radial faces of said half-segment slots and adapted to be contained within said roller cam for positioning said rollers for engagement with said driving race in the engaged condition of the clutch, a release plate rotatably mounted on said driven shaft and disposed adjacently to said roller cam, said release plate having a radial notch cut in the periphery thereof, pins secured in said roller cam and extending parallel to said shaft through openings in said release plate for imparting rotary motion to said release plate synchronous with said roller cam, a release lever pivotally connected to said base for engagement with said notch in said release plate, and a corresponding plurality of release pins projecting from the face of said release plate for engagement with said rollers, whereby upon engagement of said release lever with said notch in said release plate said release pins force said rollers along said inclined surfaces forcing said plungers within said roller cam to disengage the clutch.

2. A clutch for coupling a driving and a driven shaft comprising a roller cam secured to said driven shaft, a driving race secured to said driving shaft, said driven and said driving shafts being rotatably journalled in a supporting structure, a plurality of half-segment slots equally spaced around the periphery of said roller cam, each of said slots being formed with a single radial face and an inclined surface extending from said radial face and intersecting the periphery of said roller cam, a corresponding plurality of rollers mounted to move in a direction having a radial component along said inclined surfaces, the diameter of said rollers being less than the radial dimension of said half-segment slots, a corresponding plurality of spring-loaded plungers positioned normal to the radial faces of said half-segment slots and adapted to be contained within said roller cam for positioning said rollers to engage said driving race in the engaged condition of the clutch, a release plate rotatably mounted on said driven shaft and disposed adjacently to said roller cam, said release plate having a radial notch cut in the periphery thereof, a release lever pivotally attached to said base for engagement with said notch in said release plate, a corresponding plurality of release pins projecting from the face of said release plate for cooperative engagement with said rollers, a wedging pin secured to said roller cam and extending through an elongated hole in said release plate, said wedging pin being disposed along a radial line of said roller cam which corresponds to the radial line of said release plate on which said notch is located, said wedging pin through contact with said release plate driving said release plate in synchronism with said roller cam, and a spring-loaded wedging lever pivotally attached to said supporting structure being adapted to engage said wedging pin, whereby upon engagement of said release lever with said notch in said release plate said release pins force said rollers along said inclined surfaces forcing said plungers within said roller cam to disengage the clutch and said wedging lever engages said wedging pin to accurately position said driven shaft.

3. Apparatus as in claim 2 wherein said release plate has a plurality of radial notches in the periphery thereof and a corresponding plurality of wedging pins attached to said roller cam and extending through said release plate.

JAMES HENRY MUNCY.

REFERENCES CITED

The following references are of record in the file of this patent:

UNITED STATES PATENTS

| Number | Name | Date |
|---|---|---|
| 503,311 | Dahl | Aug. 15, 1893 |
| 554,486 | Geb | Feb. 11, 1896 |
| 1,612,623 | Evans | Dec. 28, 1926 |
| 2,089,846 | Finch | Aug. 10, 1937 |